United States Patent [19]
Levitan

[11] Patent Number: 5,278,899
[45] Date of Patent: Jan. 11, 1994

[54] DIGITAL TELEPHONE SYSTEM NOISE REDUCTION CIRCUIT

[75] Inventor: Dmitry Levitan, Fairfax, Va.

[73] Assignee: Hubbell Incorporated, Orange, Conn.

[21] Appl. No.: 862,054

[22] Filed: Apr. 2, 1992

[51] Int. Cl.[5] .................. H04M 1/00; H04M 3/42
[52] U.S. Cl. ........................... 379/399; 379/201
[58] Field of Search ............... 379/399, 201, 93, 157;
370/76, 110.1; 375/41

[56] References Cited

U.S. PATENT DOCUMENTS

| | | | |
|---|---|---|---|
| 4,901,344 | 2/1990 | Monette et al. | 379/201 |
| 4,987,573 | 1/1991 | Monette et al. | 379/201 |
| 5,016,246 | 5/1991 | Wisniewski | 379/201 |
| 5,142,402 | 8/1992 | Tsushima et al. | 359/156 |

Primary Examiner—James L. Dwyer
Assistant Examiner—Jack Chiang
Attorney, Agent, or Firm—Jerry M. Presson; Walter C. Farley

[57] ABSTRACT

A telephone system uses above voice-band ASK control and supervisory signals which are appended to digitally encoded voice by forcing the least significant bits to a selected level for transmission to the receiving end. At the receiving end, the ASK is regenerated by a circuit including special filter and a pulse generator. To eliminate audible noise resulting from the filter action, the ASK signal or the pulses from the pulse generator is shifted in phase by about 90° before application to a filter. The result is significantly reduced noise.

3 Claims, 6 Drawing Sheets

DIGITAL TELEPHONE SYSTEM NOISE REDUCTION CIRCUIT

FIELD OF THE INVENTION

This invention relates to an improvement in noise reduction circuitry for a digital telephone system particularly in the context of a private branch exchange.

BACKGROUND OF THE INVENTION

Digital equipment for use in a private branch exchange system has been developed to allow simultaneous voice and out-of-band signaling using 8 kHz ASK (amplitude-shift-keyed) signals for control and supervisory purposes. With relatively short transmission lines, the 8 Khz signals can simply be sent over the lines concurrently with the voice signals.

In an automatic private branch exchange system of this type, the telephone instruments can be electronic business sets (EBS) which are instruments having code-generating circuitry as part of the instrument itself so that lifting the receiver or depressing various buttons on the instrument causes generation of the ASK signals, with or without accompanying voice signals. The signals from the EBS pass through a hybrid circuit to a coder/decoder (CODEC) in which the voice signals are digitized and a special filter circuit recognizes the existence of the ASK signal. If the ASK is present, a signal sets the least significant bit of each 8-bit word in the coded voice signals to a selected level, e.g. "LOW". The resulting digitized signal is coupled onto the transmission line and is received at a CODEC in the central office. At the central office CODEC, the voice signal is reconstructed and the least significant bit is examined for an indication of the ASK signal. If that indication is present, the ASK signal is reconstructed and the resulting voice-ASK signal is passed through a hybrid circuit to a digital multiplex switch (DMS) which performs the necessary functions as required by the ASK signal. The connections are made by the DMS which performs the functions of connecting the call, for example, to a telephone instrument either in or outside of the private branch exchange system. A similar sequence is followed in the reverse direction.

As will be recognized, the 8 kHz ASK signal is not actually transmitted on the T1 lines because the bandwidth of the lines is not adequate. Rather, a code formed in least significant bits is used to replace that signal to permit reconstruction or regeneration of the ASK at the receiving end in the central office.

While the basic system concept as described above is sound, it has been found that numerous problems exist in the practical implementation of the system which have caused system malfunctions in the field. These problems include the generation of an unacceptable level of noise on the telephone line.

SUMMARY OF THE INVENTION

Accordingly, an object of the present invention is to provide circuit improvements to a digital telephone system which overcomes problems with the prior art apparatus.

Briefly described, the invention includes, in a telephone system of the type having a first location where ASK control or supervisory signals are generated at a frequency significantly above voice band as well as voice signals for transmission to a destination connected to the first location by voice quality telephone lines, means at the first location and of the telephone lines for digitally encoding the voice signals in a plurality of digital words and means for recognizing the presence of the ASK signals for setting the least significant bit of each digital word at one preselected state when an ASK signal is present and a second state when no ASK signal is present. At the destination end of the telephone lines, the voice signals are reconstructed and the ASK signal is regenerated in response to the LSB states. The apparatus for reconstructing includes filter circuits responsive to the presence of the ASK signal to produce an output signal. The improvement comprises means for receiving the ASK signal before that signal is applied to the filter circuits and for shifting the phase thereof and circuit means for coupling the shifted signal to the filter circuits to thereby reduce the noise produced.

BRIEF DESCRIPTION OF THE DRAWINGS

In order to impart full understanding of the manner in which these and other objects are attained in accordance with the invention, particularly advantageous embodiments thereof will be described with reference to the accompanying drawings which form a part of this specification, and wherein.

DESCRIPTION OF THE PREFERRED EMBODIMENTS

Figure 1:
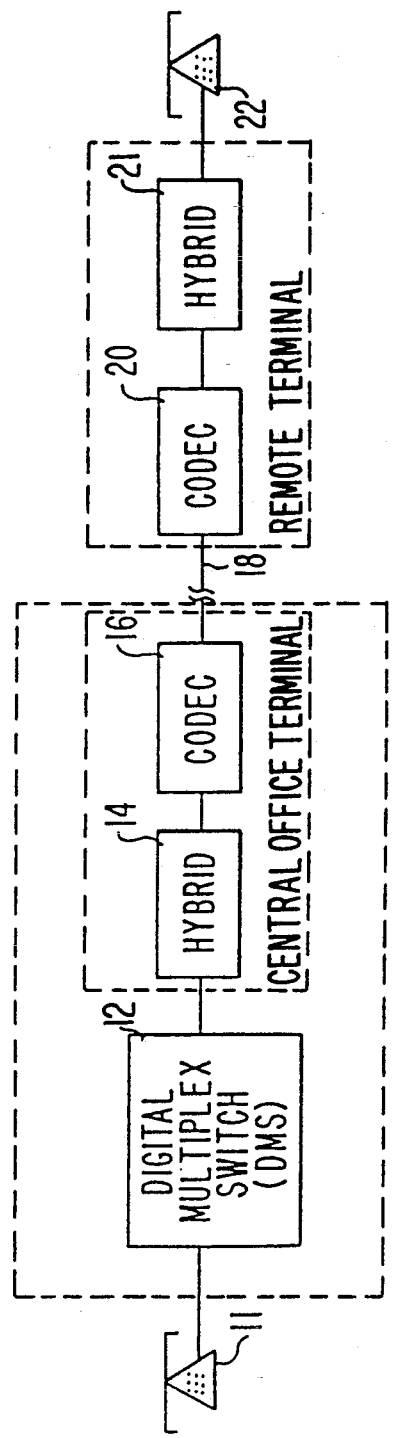
FIG. 1 is a schematic block diagram of a private branch exchange system of a type with which the invention is particularly useful.

Referring first to FIG. 1, a rather simplified schematic block diagram of a typical private branch exchange system shown therein includes a telephone instrument 11 which is connected to a digital multiplex switch (DMS) 12 in a central office. Within the central office, the central office terminal includes a hybrid circuit 14 and a CODEC 16 which is coupled to digital link 18 which can be DS-1, optical fiber or some other suitable medium interconnecting the central office with a remote terminal. In the remote terminal is a CODEC 20 and a hybrid circuit 21 which is connected to one or more electronic business sets (EBS) 22 one of which is shown in FIG. 1.

The instrument 11 may or may not be an electronic business set. A function of the equipment in the central office and the remote terminal is to perform the necessary control functions and to convey the voice information between an instrument 11 and EBS 22, or between two EBS instruments, in such a way that the user has no cognition of the existence of the switching equipment, as such. In other words, the equipment should be transparent to the user.

Communication between CODECs 16 and 20 on optical fibers or T1 lines 18 includes transmission of the digital signals mentioned above which include digitized voice signals in digital words the LSB of each of which is set at either low or high level to indicate the presence or absence of an ASK signal. Each CODEC, when it receives a digitized signal from lines 18, must reconstitute the analog voice signal and also regenerate or reconstruct the ASK signal.

Figure 2:
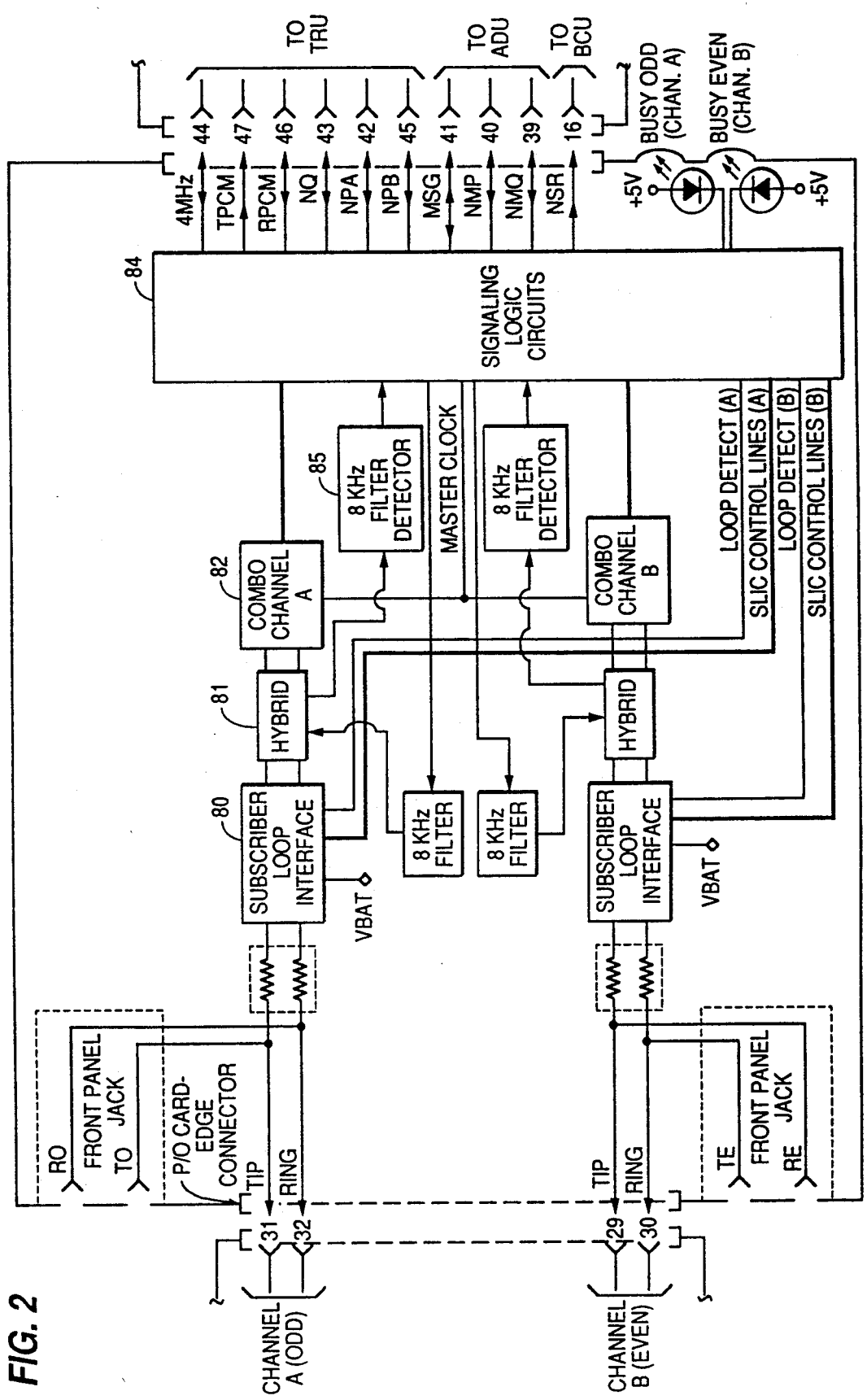
FIG. 2 is a schematic diagram, partly in block form, of EBS channel unit circuitry showing the context of the present invention.

FIG. 2 is a simplified schematic diagram, mostly in block form, of an RT EBS channel unit including combos, filters and associated circuitry to perform this function. Each combo includes a CODEC and other circuits. The channel unit circuitry of FIG. 2 can be thought of as being in either the central office terminal (COT) or the remote terminal (RT) since the two are very similar and perform the same functions.

Much of the circuitry shown in FIG. 2 is conventional and will not be described in detail. The odd channel will be discussed, the even channel being electrically identical. The incoming VF signals on tip and ring are passed through the subscriber loop interface circuit (SLIC) 80 and hybrid 81 to the combination codec and filter (combo) 82. The SLIC 80 provides battery feed to the RT EBS CU and monitors current flow. Loop current status is sent over the digital carrier to the COT EBS CU. Presence or absence of current is duplicated at the tip and ring of the COT EBS CU, so that the centrex line card in the DMS sees the proper dc load. Incoming 8 kHz information is filtered and detected in filter/detector 85 and sent to the signaling logic circuitry 84. The filter rejects VF components and any other out-of-band noise to ensure proper detection of the 8 kHz ASK signal.

The signaling logic circuitry converts the ASK message information and codec audio information to digital pulse code modulation (PCM). The PCM output is provided to the TRU via the transmit PCM (TPCM) line and associated backplane timing signals.

Once per frame, every 125 microseconds ($\mu$sec), the common equipment addresses the odd channel in a specific channel bank slot via signals NQ and NPA. When these signals coincide (both low), the logic circuitry forwards the 8-bit PCM word (followed by seven bits of signaling information and one odd parity bit) into the TPCM bus in the correct time slot and in the correct format. This occurrence differs in time depending on the channel unit position in the channel bank.

The logic circuitry also generates signaling used for channel bank internal supervision and sends the information to the common equipment via the Message Line bus.

The receive path is as follows. VF signals from the COT channel unit come in over the digital PCM line. the RT common equipment decodes the PCM and forwards the information to the receive PCM (RPCM) line of the RT EBS CU. At the appropriate time the channel unit receive logic circuitry in unit 84 samples the RPCM signal and forwards the data to the codec in combo 82 and to the ASK signaling logic. The codec converts the digital information into an analog signal and limits this signal to approximately 3400 Hz prior to routing it to the SLIC 80. The ASK signaling logic converts the digital signaling information into 8-kHz ASK information and sends it to the SLIC where it is combined with the VF signal and sent out on tip and ring. Tip and ring are connected to the EBS instrument by up to 1.5 kilofeet of non-loaded 26 gauge cable (or other combinations of non-loaded 22-, 24- and 26-gauge cable).

Every 125 $\mu$sec, when signals on NQ and NPA coincide (both low), the logic circuitry accepts the RPCM word and decodes it into VF and signaling information. The signaling information (seven bits A, B, C, D, E, F, G codes and one parity bit) is used for channel unit supervision. The VF PCM (seven or eight bits per sample) is passed to the receive section of the combo.

The problem to which the invention relates arises when the received PCM signal is received by VF limited filters in the combo. The difficulty arises from the creation of an unacceptable level of noise during 8 Khz ASK transmission while the user is off-hook.

Figure 3A:
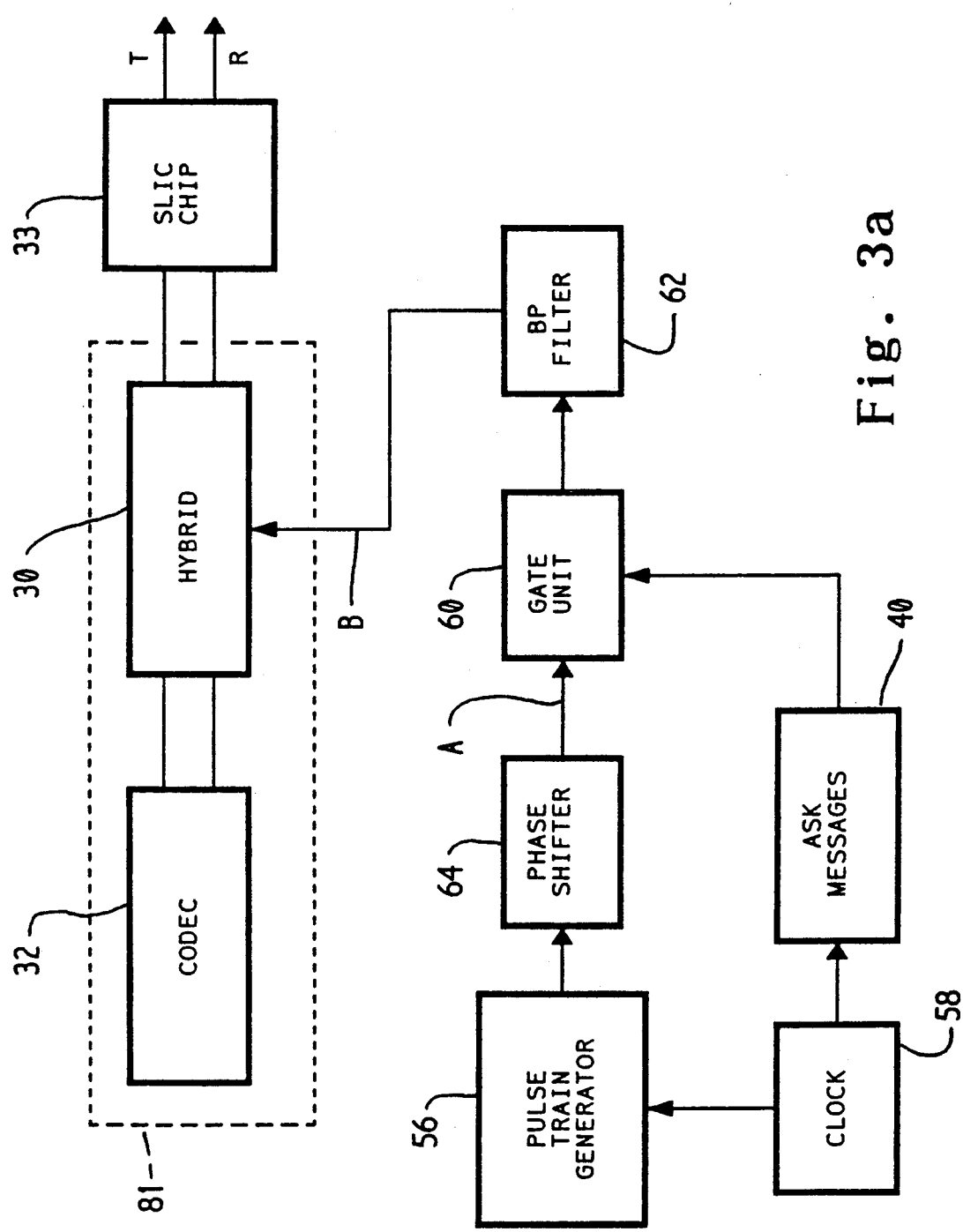
FIGS. 3a and 3b are schematic block diagrams of ASK signal regenerating circuits including a phase shifting circuit in accordance with the present invention.
Figure 3B:
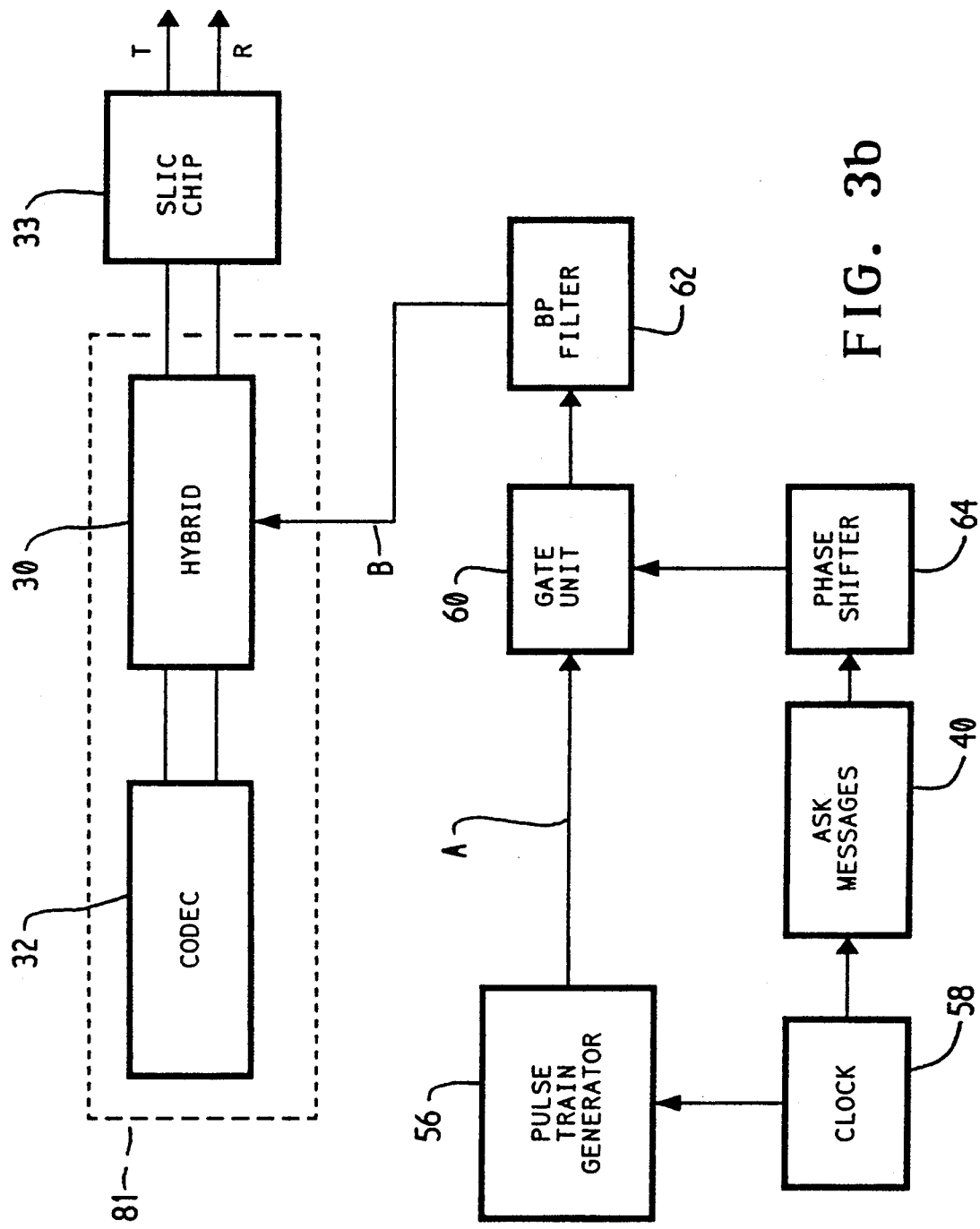

FIGS. 3a and 3b show in more detail those portions of the system which involve the present invention. In each of those Figures, codec 32 delivers signals to the hybrid 30 which combines the voice information with a regenerated ASK signal for delivery to the SLIC chip 33. The regeneration of the ASK signal in a generator 42 involves a pulse train generator 56 which produces pulses at intervals of 125 $\mu$sec. under the control of a clock 58. Gates 60 permit groups of the pulses to pass in accordance with message gate pulses having a duration of 1 ms each from a control data receive unit 40. When an ASK message is to be produced, a 1 ms burst of 125 $\mu$s pulses is released from gate unit 60 and is filtered in filter unit 62 for delivery to the hybrid.

Prior solutions involving shaping of the envelope of the pulses out of the filter reduced the noise somewhat, but the remaining noise was regarded as still being unacceptable and further shaping of the envelope was counterproductive. It was found, however, that by appropriately shifting the phase of the onset of the pulse train, a substantial further reduction in noise could be obtained.

As shown in FIGS. 3a and 3b, this is achieved by including a phase shifting circuit 64 in the pulse generating system to shift the phase of the pulse train by about 90°. In the embodiment of FIG. 3a, the phase shifter 64 is inserted between generator 56 and gate unit 60 so that pulses A are delayed, preferably by 90°, with respect to the beginning of the ASK message interval of 1 ms. In the embodiment of FIG. 3b, phase shifter 64 is inserted between ASK message unit 40 and gate unit 60 so that the ASK message interval is delayed relative to pulses A. The effect is the same.

Figure 4:
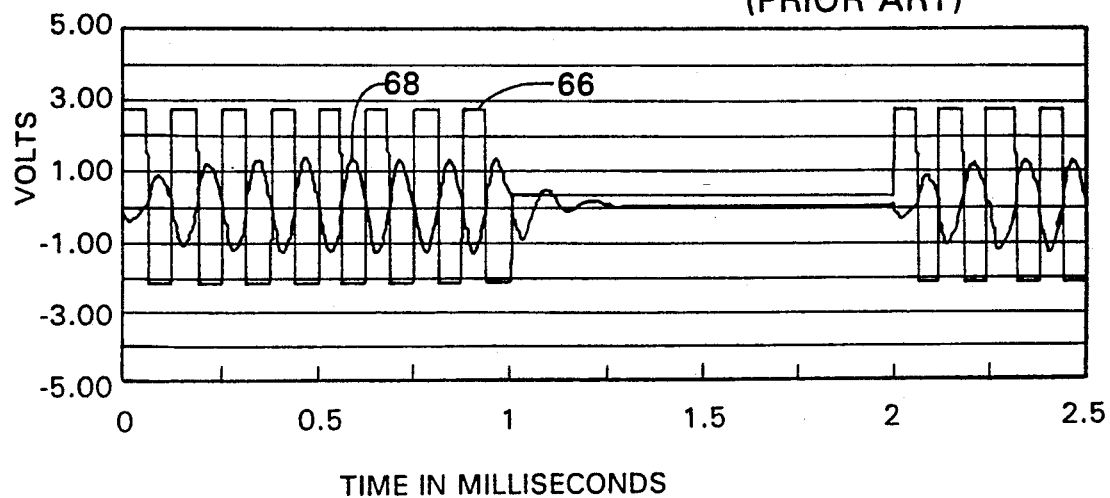
FIG. 4 is a waveform diagram illustrating the time relationship of pulses in a typical ASK signal in accordance with the prior art.
Figure 5:
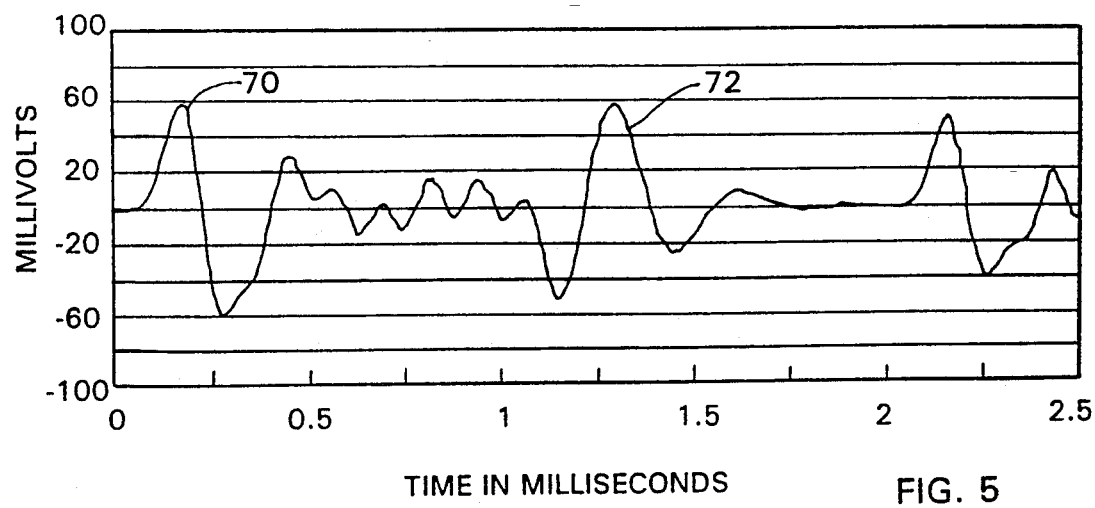
FIG. 5 is a waveform diagram showing noise amplitude resulting from the signal of FIG. 4.

A comparison of the unshifted and shifted signals is illustrated in FIGS. 4, 5, 6 and 7. FIG. 4 shows a graph of eight cycles 66 of the 8 Khz signal as produced at the output of gate unit 60 without a shift in phase. These generally rectangular pulses are equivalent to pulses A in FIG. 3 but without the phase delay. Also shown in FIG. 4 is a representation of the filtered signal 68 resulting from that pulse train which corresponds to the sinusoidal signal B but, again, without the effect of the phase shift. FIG. 5 is a graphical representation of the noise in the voice channel which is produced as a result of the pulse signals. It will be observed that the noise signal includes relatively large amplitude portions 70 and 72 which are evident on the voice channel as noise.

Figure 6:
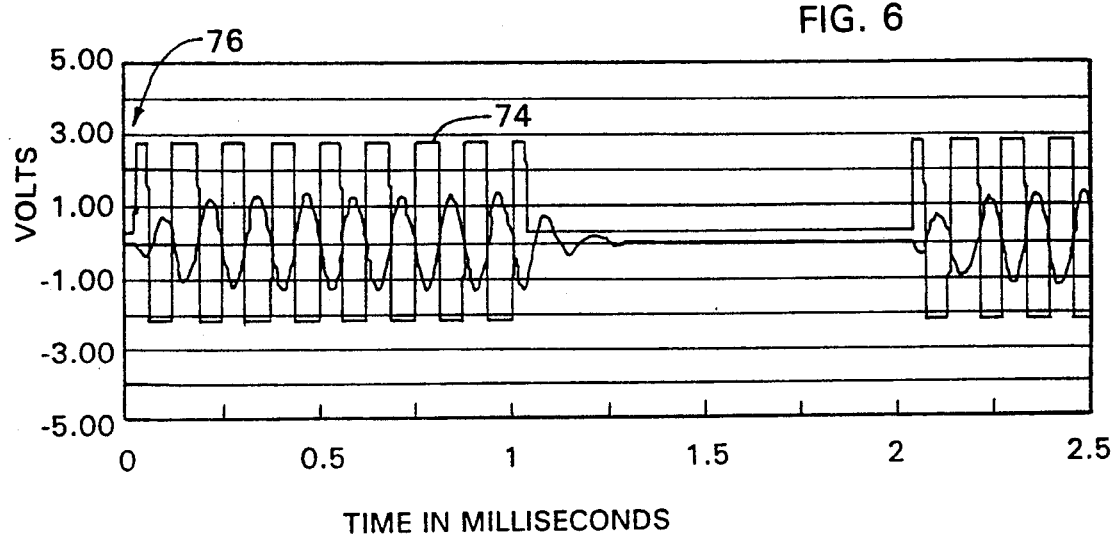
FIG. 6 is a waveform diagram illustrating the time relationship of pulses in a typical ASK signal in accordance with the present invention.
Figure 7:
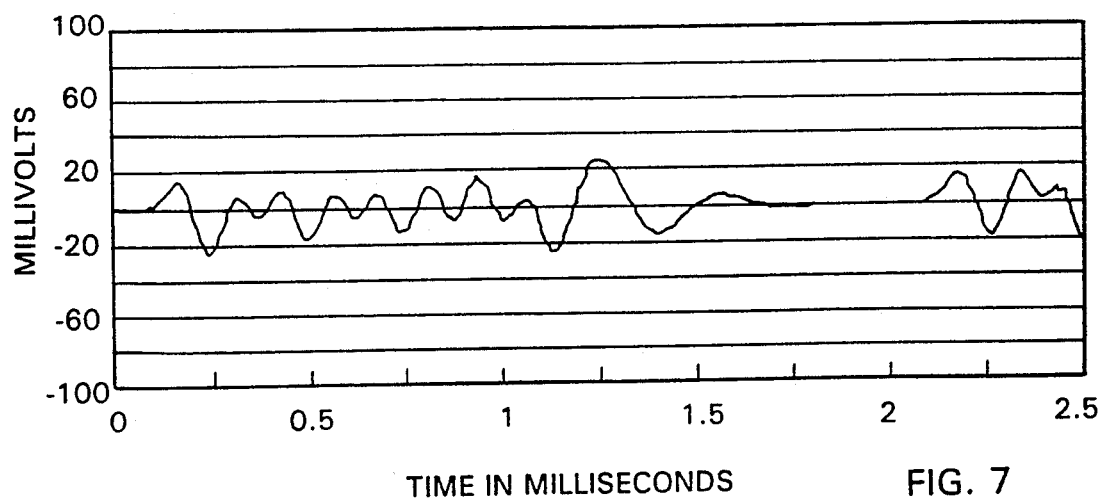
FIG. 7 is a waveform diagram showing the reduced noise amplitude resulting from the signal of FIG. 6.

FIG. 6 shows the pulses equivalent to 66 shifted in phase in accordance with the invention. The pulse train 74 contains the same information as the pulse train 66, but begins 90° later than pulse train 66, as indicated at 76. Surprisingly, this small change in phase dramatically reduces the large noise pulses as will be evident from the graph in FIG. 7 which shows the same kind of information to the same scale as the graph of FIG. 5. The noise which is evident on the line to a user of the system is also dramatically reduced, as would be expected from a comparison of FIGS. 5 and 7, and the system acceptability is thus much improved.

While certain advantageous embodiments have been chosen to illustrate the invention, it will be understood by those skilled in the art that various changes and modifications can be made therein without departing from the scope of the invention as defined in the appended claims.

What is claimed is:

1. In a telephone system including means at a first location for generating amplitude shift key (ASK) control or supervisory signals at a frequency significantly above voice band and voice signals for transmission to a destination connected to said first location by voice quality telephone lines, means at a first location end of the telephone lines for digitally encoding the voice signals in a plurality of digital words and means for recognizing the presence of the ASK signals for setting a least significant bit (LSB( of each said digital word at one preselected state when an ASK signal is present and a second state when no ASK signal is present, and means at a destination end of the telephone lines for reconstructing the voice signals and for regenerating the ASK signal in response to the LSB states, and wherein said means for reconstructing includes filter circuit means responsive to the presence of the ASK signal to produce an output signal, the improvement comprising circuit means for receiving the ASK signal and for shifting the phase of said ASK signal before said signal is applied to said filter circuit means, and a second circuit means for coupling said phase shifted signal to said filter circuit means to thereby reduce the amplitude of noise produced in said system.

2. A system according to claim 1 wherein said ASK signal is shifted in phase by 90°.

3. A method of reducing noise in a telephone system including means at a first location for generating amplitude shift key (ASK) control or supervisory signals at a frequency significantly above voice band and voice signals for transmission to a destination connected to said first location by voice quality telephone lines, means at a first location end of the telephone lines for digitally encoding the voice signals in a plurality of digital words and means for recognizing the presence of the ASK signals for setting a least significant bit (LSB) of each said digital word at one preselected state when an ASK signal is present and a second state when no ASK signal is present, and means at a destination end of the telephone lines for reconstructing the voice signals and for regenerating the ASK signal as a sequence of pulses in response to the LSB states, and wherein said means for reconstructing includes filter circuit means responsive to the presence of the ASK signal pulses to produce an output signal, the method comprising the step of shifting the phase of the pulses comprising the ASK signal by about 90°, and applying the phase shifted pulses to the filter circuit means to reduce the amplitude of noise produced.

* * * * *